(12) United States Patent
Gladden

(10) Patent No.: US 6,422,014 B1
(45) Date of Patent: Jul. 23, 2002

(54) TURBOCHARGER WITH CONTROLLABLE FLOW GEOMETRY FOR TWO STAGE TURBINE

(75) Inventor: John R. Gladden, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/948,342

(22) Filed: Sep. 6, 2001

(51) Int. Cl.$^7$ ............................................... F02D 23/00
(52) U.S. Cl. ........................ 60/602; 60/605.2; 123/564; 123/568.11
(58) Field of Search .............................. 60/605.1, 605.2, 60/602; 123/559.1, 564, 568.11

(56) References Cited

U.S. PATENT DOCUMENTS

| | | | | |
|---|---|---|---|---|
| 3,044,683 A | | 7/1962 | Woollenweber, Jr. ....... | 230/116 |
| 4,490,622 A | * | 12/1984 | Osborn ......................... | 290/52 |
| 4,848,086 A | * | 7/1989 | Inoue et al. .................. | 60/602 |
| 5,408,979 A | | 4/1995 | Backlund et al. ............ | 123/562 |
| 5,701,741 A | | 12/1997 | Halsall ......................... | 60/602 |
| 5,724,813 A | | 3/1998 | Fenelon et al. ............... | 60/606 |
| 6,112,523 A | * | 9/2000 | Kamo et al. .................. | 60/612 |

* cited by examiner

*Primary Examiner*—Hoang Nguyen
(74) *Attorney, Agent, or Firm*—Todd T. Taylor

(57) ABSTRACT

A turbocharger for an internal combustion engine, particularly suitable for use in a work machine, is provided with a two stage turbine including a first turbine stage and a second turbine stage. A wastegate conduit is fluidly coupled with the two stage turbine. The wastegate conduit bypasses only a single one of the first turbine stage or second turbine stage. A valve is positioned in association with the wastegate conduit for controlling flow through the wastegate conduit. A compressor is coupled with and rotatably driven by the two stage turbine. The controllable wastegate conduit provides effective control of the power input to the compressor.

21 Claims, 1 Drawing Sheet

TURBOCHARGER WITH CONTROLLABLE FLOW GEOMETRY FOR TWO STAGE TURBINE

TECHNICAL FIELD

The present invention relates to a turbocharger for use in an internal combustion engine, and, more particularly, to a turbocharger including a multi-stage turbine.

BACKGROUND

An internal combustion engine may include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chambers. The fluid which is compressed by the compressor may be in the form of combustion air or a fuel/air mixture.

U.S. Pat. No. 3,044.683 (Woollenweber) discloses a fluid passage extending from the high pressure side of the compressor to the inlet side of a turbine. A spring loaded valve is disposed within the fluid passage and opens upon a high pressure condition within the compressor. The spring loaded valve thus merely acts to bypass some of the high pressure gas on an over pressure condition to the turbine of the turbocharger.

U.S. Pat. No. 5,724,813 (Fenelon et al.) assigned to the assignee of the present invention, discloses a turbocharger having a single stage compressor. A portion of the compressed gas from the single stage compressor may be recirculated to the outlet side of the turbine using controllably actuated valves. The control scheme utilizes only a single stage compressor.

U.S. Pat. No. 5,701,741 (Halsall) discloses a turbocharger having a single stage turbine driven by exhaust gas from an exhaust manifold. A bypass valve is fluidly connected at opposite ends with the inlet and outlet to the turbine. The valve may be actuated to bypass exhaust gas around the turbine. The rotational speed of the single stage compressor may thereby be adjusted.

Bypass systems as described above which bypass from the compressor to the turbine are primarily used to prevent a "surge" condition within the compressor, rather than adjust power inputs to the compressor. Bypass systems which bypass the entire turbine are used to control the power input to the compressor. Since the entire turbine is bypassed, however, the ability to control the power input to the compressor and thus the boost from the compressor is limited. That is, it may not be possible to selectively control the boost from the compressor over a relatively wide operating range.

The present invention is directed to overcoming one or more of the problems as set forth above.

SUMMARY OF THE INVENTION

In one aspect of the invention, a turbocharger for an internal combustion engine is provided with a two stage turbine including a first turbine stage and a second turbine stage. A wastegate conduit is fluidly coupled with the two stage turbine. The wastegate conduit bypasses only a single one of the first turbine stage or second turbine stage. A valve is positioned in association with the wastegate conduit for controlling flow through the wastegate conduit. A compressor is coupled with and rotatably driven by the two stage turbine.

In another aspect of the invention, a method of operating a turbocharger in an internal combustion engine is provided with the steps of: providing a two stage turbine including a first turbine stage and a second turbine stage; fluidly coupling a wastegate conduit with the two stage turbine so as to bypass only a single one of the first turbine stage and the second turbine stage; providing a compressor mechanically coupled with the two stage turbine; controlling a flow of exhaust gas through the wastegate conduit; and rotatably driving the compressor with the two stage turbine.

DETAILED DESCRIPTION

Figure 1:
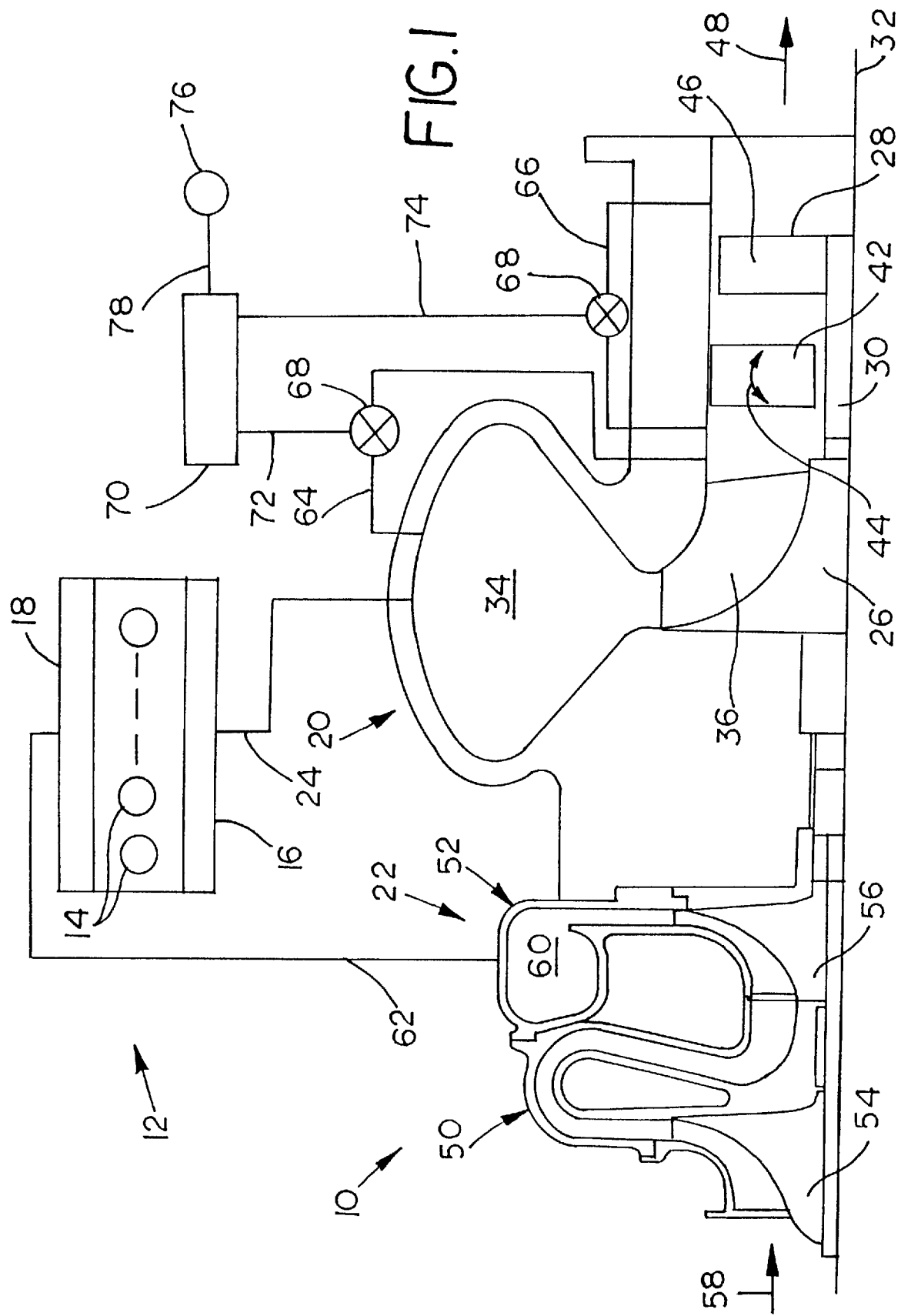
FIG. 1 is a schematic view of an embodiment of a turbocharger of the present invention for use with an internal combustion engine.

Referring now to the drawing, there is shown an embodiment of a turbocharger 10 for use with an internal combustion engine 12.

Internal combustion engine 12 generally includes a plurality of combustion cylinders 14, only three of which are shown for simplicity sake in the drawing. The particular number of combustion cylinders 14 within internal combustion engine 12 may vary, depending upon the particular application. Internal combustion engine 12 also includes an exhaust manifold 16 and an inlet manifold 18. Inlet manifold 18 provides air or a fuel/air mixture to combustion cylinders 14. Exhaust manifold 16 receives exhaust gas from combustion cylinders 14. Exhaust manifold 16 and inlet manifold 18 are shown with a single part construction for simplicity sake in the drawing. However, it is to be understood that exhaust manifold 16 and/or inlet manifold 18 may be constructed as multiple-part manifolds, depending upon the particular application.

Turbocharger 10 includes a two stage turbine 20 and a two stage compressor 22. Two stage turbine 20 is fluidly coupled with exhaust manifold 16 as indicated schematically by line 24. Two stage turbine 20 includes a first stage in the form of a radial or mixed flow turbine wheel 26 and second stage in the form of an axial turbine 28. Turbine wheel 26 and axial turbine 28 are each carried by a shaft 30 and rotatable about a longitudinal axis 32 of shaft 30. More particularly, two stage turbine 20 includes a volute section 34 which receives exhaust gas from exhaust manifold 16 via line 24. Volute section 34 may be in the form of a single volute as shown, or may be in the form of a split volute or other configuration, depending upon the particular application. Exhaust gas enters volute section 34 and impinges against a plurality of vanes 36 of turbine wheel 26. Turbine wheel 26 is thus rotatably driven by exhaust gas from exhaust manifold 16.

The exhaust gas flows in an axial direction away from turbine wheel 26 and impinges against a plurality of vanes 42 disposed radially around shaft 30 and between turbine wheel 26 and axial turbine 28. Vanes 42 are controllably actuated, as indicated by double headed arrow 44 to adjust air flow rate and direction downstream from turbine wheel 26.

The exhaust gas then flows to and impinges against a plurality of blades 46 of axial turbine 28 positioned radially around shaft 30. The particular configuration and pitch angle of blades 46 may of course be dependent upon the particular application. The spent exhaust gas then flows to a muffler system (not shown) positioned downstream from turbocharger 10, as indicated by directional arrow 48.

Two stage compressor 22 includes a first compressor 50 and a second compressor 52. First compressor 50 and second compressor 52 each include a compressor wheel 54 and 56, respectively. Two stage compressor 22 receives combustion air as indicated by directional arrow 58. First compressor wheel 54 and second compressor wheel 56 compress the combustion air in a series manner to provide a desired total compression ratio. Second compressor wheel 56 discharges the compressed combustion air into a volute section 60 which is fluidly coupled with inlet manifold 18 as indicated schematically by line 62. Two stage compressor 22 thus provides compressed combustion air to inlet manifold 18.

According to an aspect of the present invention, wastegate conduits 64 and 66 are fluidly coupled with two stage turbine 20. Wastegate conduits 64 and 66 respectively bypass only a single one of first turbine stage (i.e., turbine wheel) 26 or second turbine stage (i.e., fan) 38. In the embodiment shown, wastegate conduit 64 bypasses first turbine stage 26, and wastegate conduit 66 bypasses second turbine stage 28.

More particularly, first turbine stage 26 includes an inlet and an outlet which are respectively positioned upstream and downstream therefrom. Similarly, second turbine stage 28 includes an inlet and an outlet which are respectively positioned upstream and downstream therefrom. Wastegate conduit 64 has an inlet end fluidly coupled with the inlet of first turbine stage 26 and an outlet end fluidly coupled with the outlet of first turbine stage 26. Wastegate conduit 66 has an inlet end fluidly coupled with the inlet of second turbine stage 28 and an outlet end fluidly coupled with the outlet of second turbine stage 28. In the embodiment shown, the outlet end of wastegate conduit 64 and inlet end of wastegate conduit 66 are each fluidly coupled with a region between first turbine stage 26 and nozzle vanes 42. However, it will also be appreciated that the outlet end of wastegate conduit 64 and/or the inlet end of wastegate conduit 66 may be fluidly coupled with the region between diverter vanes 42 and second turbine stage 28.

Each wastegate conduit 64 and 66 includes a controllably actuatable valve 68 associated therewith. Valves 66 and 68 may be of conventional design, and may be configured to fully open or close, or be adjusted to an intermediate position between the full opened and closed positions.

Controller 70 is electrically coupled with each valve 68 via lines 72 and 74, respectively. Controller 70 is also electrically coupled with one or more sensors 76 via an associated line 78 and receives an input signal therefrom. Sensor 76 senses an operating parameter associated with operation of turbocharger 10 and/or internal combustion engine 12 used to controllably actuate valves 66 and 68.

INDUSTRIAL APPLICABILITY

During use, internal combustion engine 12 operates in known manner using, e.g., the diesel principle of operation. Exhaust gas is transported from exhaust manifold 16 to volute section 34 of two stage turbine 20 via line 24. The exhaust gas impinges upon vanes 36 of turbine wheel 26 and rotatably drives turbine wheel 26. The exhaust gas flows downstream from turbine wheel 26 to diverter vanes 42. Vanes 42 may be controllably actuated, such as using controller 70, to control the flow rate and/or flow direction of the exhaust gas. The exhaust gas then flows to second turbine stage or axial turbine 28. The exhaust gas impinges against blades 46 of axial turbine 28 to assist in the rotational driving of two stage turbine 20. The spent exhaust gas is then discharged to a muffler system, as indicated by arrow 48.

Rotation of turbine wheel 26 and axial turbine 28 in turn causes rotation of shaft 30 which drives first compressor wheel 54 and second compressor wheel 56 of two stage compressor 22. Combustion air or a fuel/air mixture is drawn into first compressor 50, as indicated by arrow 58. The combustion air or fuel/air mixture is compressed in a series manner within two stage compressor 22 using first compressor wheel 54 and second compressor wheel 56. The compressed combustion air or fuel/air mixture is discharged from volute section 60 of second compressor 52 to inlet manifold 18 via line 62.

Sensor 76 senses one or more operating parameters associated with internal combustion engine 12 and/or turbocharger 10 used to adjust the output power and/or rotational speed of shaft 30 within two stage turbine 20. For example, it may be desirable to control the power level or boost of two stage compressor 22. The boost of two stage compressor 22 is primarily dependent upon the rotational speed of shaft 30. Under certain operating conditions, more or less boost from two stage compressor 22 may be desirable. By controlling valves 68 associated with wastegates conduit 64 and 66, the boost of two stage compressor 22 can in turn be controlled. Controller 70 controllably actuates a selected valve 68 to open wastegate conduit 64 or 66, or both simultaneously.

In a preferred method of operation, the plurality of nozzle vanes 42 disposed radially around shaft 30 are controllably positioned to control the air flow rate and/or air flow direction between turbine wheel 26 and axial turbine 28. By controllably positioning vanes 42, the boost of two stage compressor 22 can be controlled to some extent. However, it is not always possible to control the boost of two stage compressor 22, depending upon the particular operating conditions of internal combustion engine 12. Under such circumstances, nozzle vanes 42 are first adjusted and thereafter valves 68 are controllably actuated to open wastegate conduit 64 and/or 66.

In contrast with conventional wastegate designs which bypass an entire two stage turbine from the inlet of the first turbine stage to the outlet of the second turbine stage, wastegate conduits 64 and 66 bypass only a single turbine stage within two stage compressor 20. It is therefore possible to more precisely control the boost of two stage compressor 22 since only a portion of two stage turbine 20 is bypassed. For example, the pressure ratio at the inlet and outlet of turbine wheel 26 likely is different than the pressure ratio at the inlet and outlet of axial turbine 28. By utilizing the known pressure ratios of turbine wheel 26 and/or axial turbine 28, the rotational speed of shaft 30 may be more closely controlled. This in turn results in improved control of the boost from two stage compressor 22.

Other aspects, objects and advantages of this invention can be obtained from a study of the drawings, the disclosure and the appended claims.

What is claimed is:

1. A turbocharger for an internal combustion engine, comprising:
   a two stage turbine including a first turbine stage and a second turbine stage;
   a wastegate conduit fluidly coupled with said two stage turbine, said wastegate conduit bypassing only a single one of said first turbine stage and said second turbine stage;
   a valve positioned in association with said wastegate conduit for controlling flow through said wastegate conduit; and
   a compressor coupled with and rotatably driven by said two stage turbine.

2. The turbocharger of claim 1, said first turbine stage including an inlet and an outlet, said wastegate conduit including an inlet end and an outlet end, said inlet end fluidly coupled with said inlet of said first turbine stage and said outlet end fluidly coupled with said outlet of said first turbine stage.

3. The turbocharger of claim 1, said second turbine stage including an inlet and an outlet, said wastegate conduit including an inlet end and an outlet end, said inlet end fluidly coupled with said inlet of said second turbine stage and said outlet end fluidly coupled with said outlet of said second turbine stage.

4. The turbocharger of claim 1, said first turbine stage being one of a radial turbine stage and a mixed flow turbine stage.

5. The turbocharger of claim 1, said second turbine stage being an axial turbine stage.

6. The turbocharger of claim 1, including a plurality of controllably positionable nozzle vanes between said first turbine stage and said second stage.

7. The turbocharger of claim 1, said valve being an electrically controllable valve.

8. The turbocharger of claim 7, further including a sensor for sensing an operating parameter and a controller electrically coupled with each of said sensor and said valve.

9. An internal combustion engine, comprising:
an exhaust manifold;
an intake manifold;
a two stage turbine fluidly coupled with said exhaust manifold, said two stage turbine including a first turbine stage and a second turbine stage;
a wastegate conduit fluidly coupled with said two stage turbine, said wastegate conduit bypassing only a single one of said first turbine stage and said second turbine stage;
a valve positioned in association with said wastegate conduit for controlling flow through said wastegate conduit; and
a compressor fluidly coupled with said intake manifold and mechanically coupled with and rotatably driven by said two stage turbine.

10. The internal combustion engine of claim 9, said first turbine stage including an inlet and an outlet, said wastegate conduit including an inlet end and an outlet end, said inlet end fluidly coupled with said inlet of said first turbine stage and said outlet end fluidly coupled with said outlet of said first turbine stage.

11. The internal combustion engine of claim 9, said second turbine stage including an inlet and an outlet, said wastegate conduit including an inlet end and an outlet end, said inlet end fluidly coupled with said inlet of said second turbine stage and said outlet end fluidly coupled with said outlet of said second turbine stage.

12. The internal combustion engine of claim 9, said first turbine stage being one of a radial turbine stage and a mixed flow turbine stage.

13. The internal combustion engine of claim 9, said second turbine stage being an axial turbine stage.

14. The internal combustion engine of claim 9, including a plurality of controllably positionable nozzle vanes between said first turbine stage and said second stage.

15. The internal combustion engine of claim 9, said valve being an electrically controllable valve.

16. The internal combustion engine of claim 15, further including a sensor for sensing an operating parameter and a controller electrically coupled with each of said sensor and said valve.

17. A method of operating a turbocharger in an internal combustion engine, comprising the steps of:
providing a two stage turbine including a first turbine stage and a second turbine stage;
fluidly coupling a wastegate conduit with said two stage turbine so as to bypass only a single one of said first turbine stage and said second turbine stage;
providing a compressor mechanically coupled with said two stage turbine;
controlling a flow of exhaust gas through said wastegate conduit; and
rotatably driving said compressor with said two stage turbine.

18. The method of claim 17, said first turbine stage including an inlet and an outlet, said wastegate conduit including an inlet end and an outlet end, said fluidly coupling step including fluidly coupling said inlet end with said inlet of said first turbine stage and fluidly coupling said outlet end with said outlet of said first turbine stage.

19. The method of claim 17, said second turbine stage including an inlet and an outlet, said wastegate conduit including an inlet end and an outlet end, said fluidly coupling step including fluidly coupling said inlet end with said inlet of said second turbine stage and fluidly coupling said outlet end with said outlet of said second turbine stage.

20. The method of claim 17, said controlling step including positioning a valve within said wastegate conduit and controllably actuating said valve.

21. The method of claim 20, said controlling step being carried out dependent upon at least one of a boost pressure of said turbocharger, rotational speed of said turbocharger, rotational speed of the internal combustion engine, altitude and barometric pressure.

* * * * *